(12) United States Patent
Piazza

(10) Patent No.: US 7,667,855 B2
(45) Date of Patent: Feb. 23, 2010

(54) PROVIDING POSITION INFORMATION TO COMPUTING EQUIPMENT INSTALLED IN RACKS OF A DATACENTER

(75) Inventor: William J. Piazza, Holly Springs, NC (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 12/040,337

(22) Filed: Feb. 29, 2008

(65) Prior Publication Data

US 2009/0219536 A1    Sep. 3, 2009

(51) Int. Cl.
*G01B 11/14* (2006.01)
(52) U.S. Cl. .................... 356/614; 340/825.49
(58) Field of Classification Search ................. 356/614, 356/620, 622; 340/825.49
See application file for complete search history.

(56) References Cited

U.S. PATENT DOCUMENTS

| | | | |
|---|---|---|---|
| 4,626,100 A | | 12/1986 | Johnson |
| 4,912,643 A | | 3/1990 | Beirxe |
| 5,000,564 A | | 3/1991 | Ake |
| 5,063,380 A | * | 11/1991 | Wakura .................. 340/825.49 |
| 5,764,351 A | | 6/1998 | Rheme |
| 5,914,783 A | * | 6/1999 | Barrus ......................... 356/614 |
| 6,188,973 B1 | | 2/2001 | Martinez et al. |
| 6,452,683 B1 | * | 9/2002 | Kinrot et al. ................. 356/499 |
| 6,762,691 B2 | * | 7/2004 | Piazza .................... 340/825.49 |
| 6,819,113 B2 | | 11/2004 | Von Wimmerspeg |
| 6,867,701 B2 | | 3/2005 | Lawrence et al. |
| 6,898,476 B2 | | 5/2005 | Watanabe et al. |
| 7,191,090 B1 | | 3/2007 | Cunningham |

(Continued)

FOREIGN PATENT DOCUMENTS

JP    5257527 A    10/1993

(Continued)

OTHER PUBLICATIONS

Anonymous: "Method for automated indication of the physical location of computer systems" IP.COM Journal, IP.COM, Inc., West Henrietta, NY, US, Feb. 25, 2004, XP013014470 ISSN: 1533-0001 the whole document.

(Continued)

*Primary Examiner*—Roy Punnoose
(74) *Attorney, Agent, or Firm*—John Biggers; Cynthia G. Seal; Biggers & Ohanian LLP.

(57) ABSTRACT

Methods, apparatus, and products are disclosed for providing position information to computing equipment installed in racks of a datacenter that includes: projecting, by a projection module, a plurality of optical signals to a plurality of reference points on at least one reflective surface above the racks of the datacenter, each optical signal corresponding to one of the reference points and encoding reference point position information for that corresponding reference point; detecting, by a position detection module mounted on one of the racks, one or more of the optical signals reflected off of the reflective surface; determining, by the position detection module, rack position information in dependence upon the reference point position information; and providing, by the position detection module, the rack position information to a position information consumer that uses the rack position information to identify the position of the rack on which the position detection module is mounted.

20 Claims, 7 Drawing Sheets

U.S. PATENT DOCUMENTS

| | | |
|---|---|---|
| 7,242,466 B2 * | 7/2007 | Kong et al. .................. 356/218 |
| 7,436,303 B2 * | 10/2008 | Tourrilhes et al. ........ 340/572.1 |
| 7,460,978 B1 * | 12/2008 | Brey et al. .................. 702/150 |
| 2002/0091463 A1 | 7/2002 | Piazza |
| 2004/0008113 A1 | 1/2004 | Pradhan et al. |
| 2004/0158627 A1 | 8/2004 | Thornton |
| 2004/0178269 A1 | 9/2004 | Pradhan et al. |
| 2005/0138439 A1 | 6/2005 | Rothman et al. |
| 2005/0246436 A1 | 11/2005 | Day et al. |
| 2006/0167624 A1 | 7/2006 | Whalley et al. |
| 2006/0171538 A1 | 8/2006 | Larson et al. |
| 2008/0204699 A1 * | 8/2008 | Benz et al. ................. 356/4.01 |

FOREIGN PATENT DOCUMENTS

| | | |
|---|---|---|
| WO | WO 2005/098476 A1 | 10/2005 |

OTHER PUBLICATIONS

Anonymous: "Racked device detection location and identification scheme" Research Disclosure, Mason Publications, Hampshire, GB, vol. 447, No. 86, Jul. 1, 2001, XP007128587, ISSN: 0374-4353 the whole document.

PCT Search Report, May 11, 2009, PCT Application No. PCT/EP2009/51750.

* cited by examiner

US 7,667,855 B2

PROVIDING POSITION INFORMATION TO COMPUTING EQUIPMENT INSTALLED IN RACKS OF A DATACENTER

BACKGROUND OF THE INVENTION

1. Field of the Invention

The field of the invention is data processing, or, more specifically, methods, apparatus, and products for providing position information to computing equipment installed in racks of a datacenter.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One of the areas in which progress has been made is in aggregating these powerful computing systems together in a datacenter. Datacenters may contain many servers, hundreds or even thousands of servers, installed in various racks through the datacenter. From time to time, servers may be installed in or removed from a data center for many reasons including, for example, for maintenance or replacement. Often the maintenance or replacement of a server is time sensitive because that server may perform important business functions. Due to the large number of servers and racks in a typical datacenter, however, tracking down the physical location of a particular rack or a particular server in such a datacenter is often difficult and time-consuming.

SUMMARY OF THE INVENTION

Methods, apparatus, and products are disclosed for providing position information to computing equipment installed in racks of a datacenter that includes: projecting, by a projection module, a plurality of optical signals to a plurality of reference points on at least one reflective surface above the racks of the datacenter, each optical signal corresponding to one of the reference points and encoding reference point position information for that corresponding reference point; detecting, by a position detection module mounted on one of the racks, one or more of the optical signals reflected off of the reflective surface; determining, by the position detection module, rack position information in dependence upon the reference point position information encoded in the detected optical signals; and providing, by the position detection module, the rack position information to a position information consumer that uses the rack position information to identify the position of the rack on which the position detection module is mounted in the datacenter.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
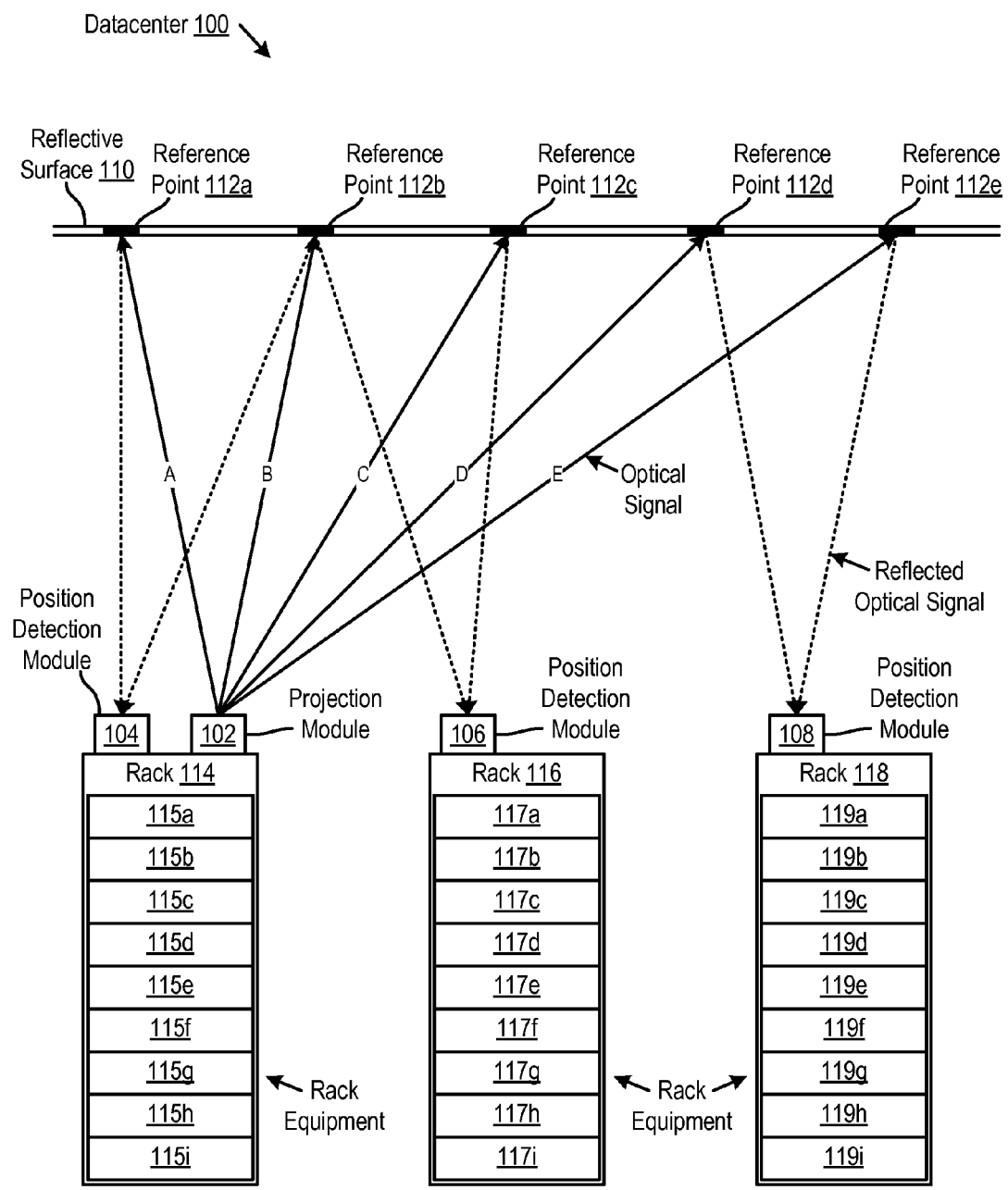
FIG. 1 sets forth a line drawing illustrating an exemplary datacenter useful in providing position information to computing equipment installed in racks of a datacenter according to embodiments of the present invention.

Exemplary methods, apparatus, and products for providing position information to computing equipment installed in racks of a datacenter in accordance with the present invention are described with reference to the accompanying drawings, beginning with FIG. 1. FIG. 1 sets forth a line drawing illustrating an exemplary datacenter (100) useful in providing position information to computing equipment installed in racks (114, 116, 118) of the datacenter (100) according to embodiments of the present invention. The exemplary system in FIG. 1 provides position information to computing equipment installed in racks (114, 116, 118) of the datacenter (100) according to embodiments of the present invention as follows: A projection module (102) projects a plurality of optical signals to a plurality of reference points (112) on at least one reflective surface (110) above the racks (114, 116, 118) of the datacenter (100). Each optical signal corresponds to one of the reference points (112) and encodes reference point position information for that corresponding reference point (112). At least one position detection module (104, 106, 108) mounted on the racks (114, 116, 118) detects one or more of the optical signals reflected off of the reflective surface (110). The position detection module (104, 106, 108) determines rack position information in dependence upon the reference point position information encoded in the detected optical signals and provides the rack position information to a position information consumer that uses the rack position information to identify the position of the rack (114, 116, 118) on which the position detection module is mounted in the datacenter.

In the example of FIG. 1, the datacenter (100) useful in providing position information to computing equipment installed in racks (114, 116, 118) of the datacenter (100) according to embodiments of the present invention is a facility used for housing electronic equipment such as computers, servers, data communications equipment, and the like. Datacenters may occupy one room of a building, one or more floors, or an entire building. In the example of FIG. 1, the datacenter (100) includes three computer racks (114, 116, 118) in which rack equipment (115, 117, 119) is mounted. In many embodiments, each rack (114, 116, 118) may include any number of 19-inch rack cabinet bays. A 19-inch rack is a standardized system for mounting various electronic modules in a "stack," or rack, 19 inches wide. A datacenter may be implemented in various forms such as, for example, a blade center in which a number of blade servers are installed.

The rack equipment (115, 117, 119) installed in each rack (114, 116, 118) may include rack-mounted servers, routers, switches, power systems, blade server chassis configured with or without blade servers, and any other equipment as will occur to those of skill in the art. Such equipment (115, 117, 119) may be installed into cabinet slots of each rack (114, 116, 118) or removed from those cabinet slots at any time for any reason. The rack equipment (115, 117, 119) may also be moved from one cabinet slot to another cabinet slot or from one rack to another rack. Although only a limited number of racks configured with a limited number of rack equipment is illustrated in FIG. 1, readers of skill in the art will immediately recognize that a datacenter useful in the present invention may include any number of racks configured with any number of rack equipment components.

In the example of FIG. 1, the rack (114) has mounted on its top a projection module (102). The projection module (102) is a computing system that projects a plurality of optical signals to a plurality of reference points (112) on at least one reflective surface (110) above the racks (114, 116, 118) of the datacenter (100) according to embodiments of the present invention. The reflective surface (110) may be implemented as the ceiling of the datacenter (100), one or more reflective surfaces mounted in or hanging from the ceiling of the datacenter (100), or any other implementation as will occur to those of skill in the art. The reference points (112) on the one or more reflective surfaces (110) are typically arranged in a manner that is predefined by a system administrator. In many embodiments a system administrator may arrange the reference points (112) such that those reference points (112) form a grid on the reflective surface (110). Readers will note however that the pattern in which the reference points are arranged may vary from one embodiment to another. Regardless of the pattern in which the reference points (112) are arranged, however, at least one reference point (112) should be visible to each of the position detection modules (104, 106, 108) mounted on top of various racks (114, 116, 118) throughout the datacenter (100). The position detection modules (104, 106, 108) mounted on top of various racks (114, 116, 118) throughout the datacenter (100) then utilize these optical signals to determine the rack position information for the respective rack on which the position detection modules are mounted.

Each optical signal projected by the projection module (102) corresponds to one of the reference points (112). For example, the projection module (102) of FIG. 1 projects optical signal 'A' to reference point (112a). The projection module (102) projects optical signal 'B' to reference point (112b) illustrated in FIG. 1. The projection module (102) projects optical signal 'C' to reference point (112c). The projection module (102) projects optical signal 'D' to reference point (112d) illustrated in FIG. 1. The projection module (102) projects optical signal 'E' to reference point (112e).

In each optical signal, the projection module (102) also encodes reference point position information for the reference point (112) that corresponds to that particular optical signal. The reference point position information for a particular reference point (112) may specify the position of the particular reference point relative to some fixed location such as, for example, a corner of a room, a specific location in the datacenter, geographic coordinates, or another reference point. In FIG. 1 for example, the reference point information for the reference point (112b) may specify that the reference point (112b) is seven feet from reference point (112a). In another example, consider that the datacenter is divided into blocks of a grid. In such an example, the reference point information for the reference point (112b) may specify that the reference point (112b) is located in grid block 'A2.' The projection module (102) may encode reference point position information in an optical signal by modulating the optical signal in any manner as will occur those of skill in the art.

In the example of FIG. 1, each rack (114, 116, 118) has mounted on its top a position detection module (104, 106, 108). The position detection module (104) is mounted atop rack (114), the position detection module (106) is mounted atop rack (116), and the position detection module (108) is mounted atop rack (118). Each position detection module (104, 106, 108) is a computing system that operates to detect one or more of the optical signals reflected off of the reflective surface (110), to determine rack position information in dependence upon the reference point position information encoded in the detected optical signals, and to provide the rack position information to a position information consumer according to embodiments of the present invention. In the example of FIG. 1, the position detection module (104) detects reflected optical signals from reference points (112a and 112b). The position detection module (106) detects reflected optical signals from reference points (112b and 112c). The position detection module (108) detects reflected optical signals from reference points (112d and 112e).

A position information consumer is a software module that uses the rack position information to identify the position of the rack (114, 116, 118) on which the position detection module is mounted in the datacenter. In any given embodiment, there may be a single position information consumer or multiple position information consumers. The position information consumers may receive rack position information from one or more position detection module through a direct data communication connection, through a data communications bus, or a data communications network. In the example of FIG. 1, a position information consumer may be implemented as software installed on the equipment (115, 117, 119) mounted in the racks (114, 116, 118), software installed on an administrative computer (not shown) that manages the datacenter (100), or any other software installed in a system as will occur those of skill in the art that may use the rack position information determined by the position detection modules (104, 106, 108).

Figure 2:
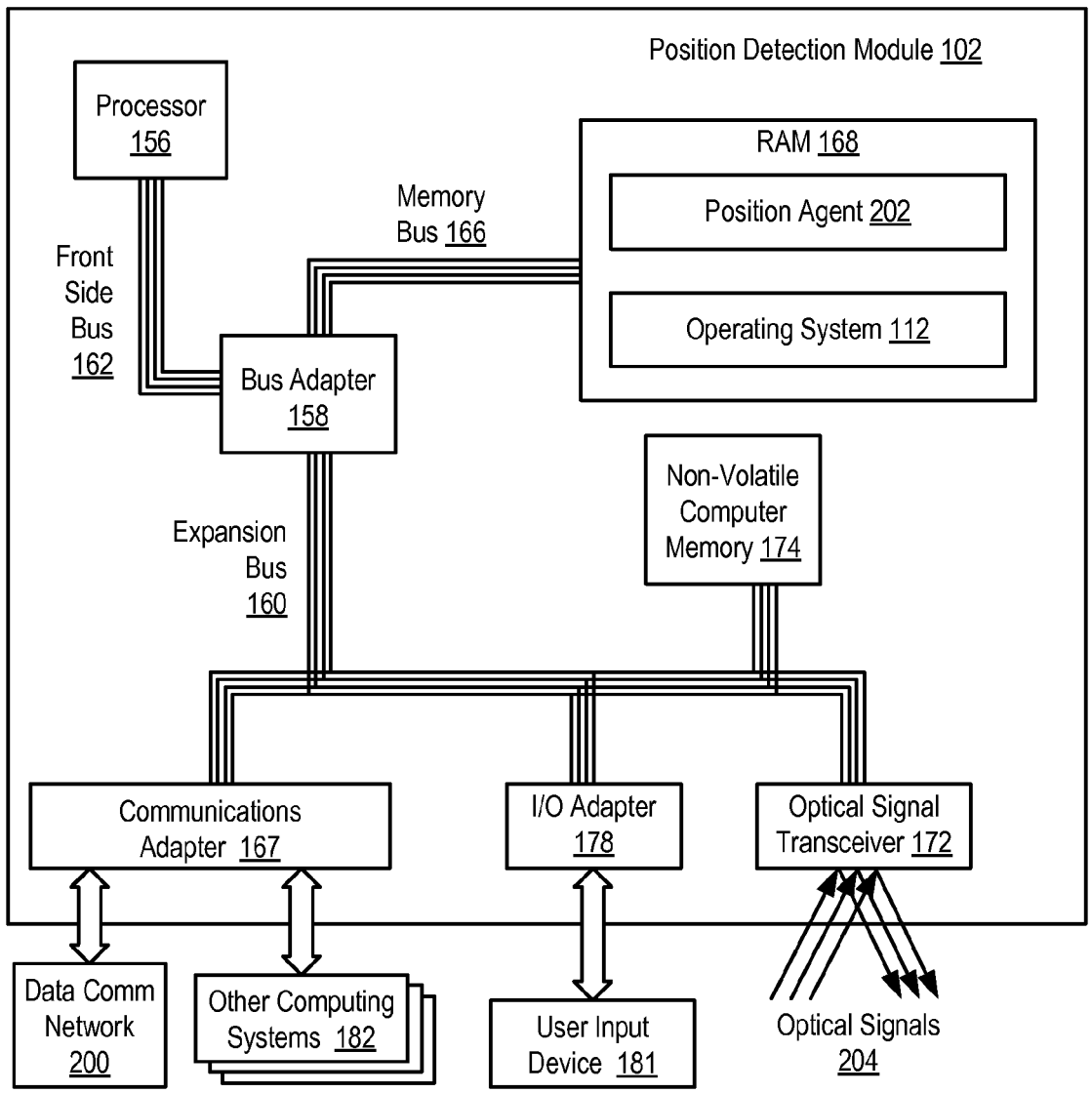
FIG. 2 sets forth a block diagram of automated computing machinery comprising an exemplary position detection module useful in providing position information to computing equipment installed in racks of a datacenter according to embodiments of the present invention.

Providing position information to computing equipment installed in racks of a datacenter is generally implemented with computers, that is, with automated computing machinery. In FIG. 1, for example, the projection module, the position detection modules, and the rack equipment are implemented to some extent at least as computers. For further explanation, therefore, FIG. 2 sets forth a block diagram of automated computing machinery comprising an exemplary position detection module (102) useful in providing position information to computing equipment installed in racks of a datacenter according to embodiments of the present invention. The exemplary position detection module (102) of FIG. 2 is mounted on one of the racks in the datacenter. The exemplary position detection module (102) of FIG. 2 includes at least one computer processor (156) or 'CPU' as well as random access memory (168) ('RAM') which is connected through a high speed memory bus (166) and bus adapter (158) to processor (156) and to other components of the position detection module (102).

Stored in RAM (168) is a position agent (202), which is a set of computer program instructions useful in providing position information to computing equipment installed in racks of a datacenter in accordance with embodiments of the present invention. The position agent (202) operates to provide position information to computing equipment installed in racks of a datacenter in accordance with embodiments of the present invention by: detecting one or more of the optical signals reflected off of a reflective surface; determining rack position information in dependence upon the reference point position information encoded in the detected optical signals; and providing the rack position information to a position information consumer that uses the rack position information to identify the position of the rack on which the position detection module is mounted in the datacenter.

Also stored in RAM (168) is an operating system (112). Operating systems useful in computing systems according to embodiments of the present invention may include versions of UNIX™, Linux™, Microsoft Vista™, IBM's AIX™, IBM's i5/OS™, and others as will occur to those of skill in the art. In many embodiments, lightweight versions of such exemplary operating systems may also be useful. The position agent (202) and the operating system (112) in the example of FIG. 2 are shown in RAM (168), but many components of such software typically are stored in non-volatile computer memory (174).

The exemplary position detection module (102) of FIG. 2 includes an optical signal transceiver (172) connected to the other components of the position detection module (102) through expansion bus (160) and bus adapter (158). The optical signal transceiver (172) of FIG. 2 is capable of generating and detecting optical signals (204) useful in embodiments of the present invention over a wide range of angles. The optical signal transceiver (172) may be implemented using a combination of photodiodes and light emitting diodes operatively coupled to a microcontroller. Such optical signal transceivers, however, are for explanation and not for limitation. Optical signal transceivers may also be implemented using any other technologies as will occur to those of skill in the art. In addition, readers will note that including an optical transceiver in a position detection module is for explanation only and not for limitation. In many embodiments, a position detection module may only include an optical receiver implemented using phototransistors and circuitry as will occur to those of ordinary skill in the art.

The exemplary position detection module (102) of FIG. 2 includes bus adapter (158), a computer hardware component that contains drive electronics for high speed buses, the front side bus (162) and the memory bus (166), as well as drive electronics for the slower expansion bus (160). Examples of bus adapters useful in position detection modules useful according to embodiments of the present invention include the Intel Northbridge, the Intel Memory Controller Hub, the Intel Southbridge, and the Intel I/O Controller Hub. Examples of expansion buses useful in position detection modules useful according to embodiments of the present invention may include Peripheral Component Interconnect ('PCI') buses and PCI Express ('PCIe') buses. In some other embodiments, however, the complexity of expansion buses such as PCI and PCIe may not be needed. Expansion busses that operate using less complex protocols may therefore be appropriate such as, for example, an Inter-Integrated Circuit ('I²C') bus, 1-Wire bus, System Management Bus ('SMB'), Serial Peripheral Interface ('SPI') Bus, Intelligent platform management bus ('IPMB'), Universal Serial Bus ('USB'), and so on.

The exemplary position detection module (102) of FIG. 2 includes one or more input/output ('I/O') adapters (178). I/O adapters in position detection modules implement user-oriented input/output through, for example, software drivers and computer hardware for controlling output to devices such as computer display screens or printers, as well as user input from user input devices (181) such as keyboards and mice. Although not depicted in the example of FIG. 2, other computing systems in other embodiments of the present invention may include a video adapter, which is an example of an I/O adapter specially designed for graphic output to a display device such as a display screen or computer monitor. A video adapter is typically connected to processor (156) through a high speed video bus, bus adapter (158), and the front side bus (162), which is also a high speed bus. In some embodiments, the I/O adapter may be implemented as a USB adapter that provides a USB port for each piece of equipment installed in the rack. In still other embodiments, the I/O adapter may be implemented as components that communicate with external devices such as, for example, switches, hubs, and routers.

The exemplary computing system (100) of FIG. 2 includes a communications adapter (167) for data communications with other computing systems (182) and for data communications with a data communications network (200). Such data communications may be carried out through Ethernet connections, through buses such as a USB, Joint Test Action Group ('JTAG') bus, or a proprietary bus, through data communications networks such as IP data communications networks, and in other ways as will occur to those of skill in the art. Communications adapters implement the hardware level of data communications through which one computing system sends data communications to another computing system, directly or through a data communications network. Examples of communications adapters useful according to embodiments of the present invention include modems for wired dial-up communications, IEEE 802.3 Ethernet adapters for wired data communications network communications, and IEEE 802.11b adapters for wireless data communications network communications.

Figure 3:
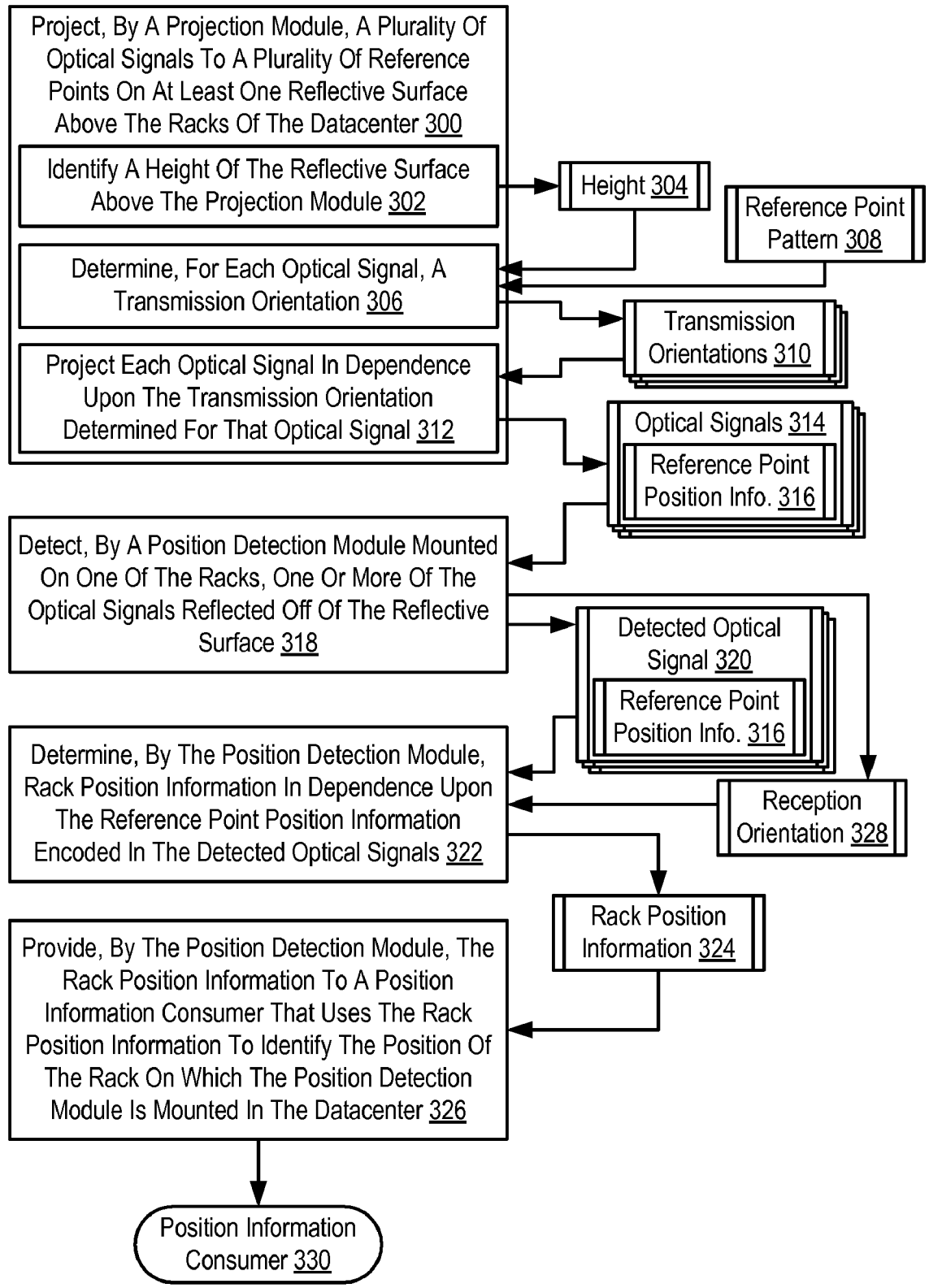
FIG. 3 sets forth a flow chart illustrating an exemplary method for providing position information to computing equipment installed in racks of a datacenter according to embodiments of the present invention.

For further explanation, FIG. 3 sets forth a flow chart illustrating an exemplary method for providing position information to computing equipment installed in racks of a datacenter according to embodiments of the present invention. The method of FIG. 3 includes projecting (300), by a projection module, a plurality of optical signals (314) to a plurality of reference points on at least one reflective surface above the racks of the datacenter. The projection module may project (300) a plurality of optical signals (314) to a plurality of reference points on at least one reflective surface above the racks of the datacenter according to the method of FIG. 3 using a system of mirrors and lens configured in a manner that will occur to those of ordinary skill in the art. Each optical signal (314) corresponds to one of the reference points. That is, the projection module may transmit one optical signal for each reference point, each optical signal striking a different reference point on the reflective surface. Each optical signal (314) also encodes reference point position information (316)

for the reference point that corresponds to that optical signal. As mentioned above, the reference point position information for a particular reference point may specify the position of the particular reference point relative to some fixed location such as, for example, a corner of a room, a specific location in the datacenter, geographic coordinates, or another reference point.

In many embodiments, the projection module projects the optical signals on the reflective surface according to some predetermined reference point pattern that specifies certain distances between the reference points on the reflective surface. In order to project the optical signals according to such a pattern, the projection module typically uses the height of the reflective surface above the projection module.

Accordingly, projecting (300), by a projection module, a plurality of optical signals (314) to a plurality of reference points on at least one reflective surface above the racks of the datacenter according to the method of FIG. 3 includes identifying (302) a height (304) of the reflective surface above the projection module. Identifying (302) a height (304) of the reflective surface above the projection module according to the method of FIG. 3 may be carried out by retrieving a value for the height (304) from a predefined storage location in memory or by calculating a value for the height (304) upon initialization of the projection module.

Figure 4A:
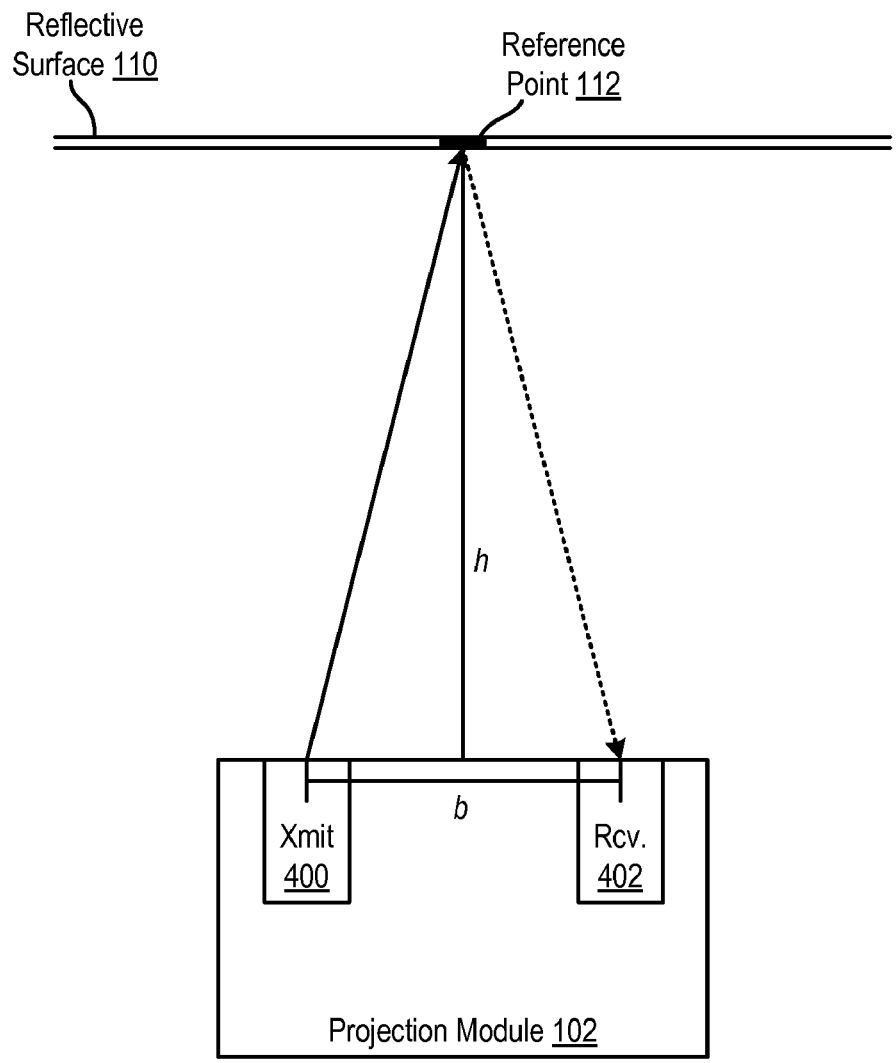
FIG. 4A sets forth a line drawing illustrating an exemplary projection module useful in providing position information to computing equipment installed in racks of a datacenter according to embodiments of the present invention.

For further explanation of calculating a value for the height (304) upon initialization of the projection module, FIG. 4A sets forth a line drawing illustrating an exemplary projection module (102) useful in providing position information to computing equipment installed in racks of a datacenter according to embodiments of the present invention. The projection module (102) of FIG. 4A includes an optical signal transmitter (400) and an optical signal receiver (402).

When the projection module (102) in FIG. 4A initializes, an optical signal transmitter (400) projects an optical signal to a reference point (112) on a reflective surface (110). The optical signal receiver (402) detects the optical signal reflected at the reference point (112) by reflective surface. Because the distance b between the transmitter (400) and the receiver (402) in FIG. 4A is fixed and because the height h typically is substantially greater than the distance between the transmitter (400) and the receiver (402), the height h may be approximated according to the following calculation:

$$h = c*t \div 2$$

where h is the height of the reflective surface above the projection module (102), c is the speed of light, and t is the time period beginning when the optical signal is projected by the transmitter (400) and ending when the optical signal is received by the receiver (402).

Readers will note that the description above of identifying (302) a height (304) of the reflective surface above the projection module is for explanation only and not for limitation. In other embodiments, the optical transmitter may project an optical signal at the reflective surface while changing the angle at which the optical signal is transmitted until the optical signal is detected by the optical receiver. When the optical receiver detects the optical signal, the projection module may calculate a value for the height using the angle at which the transmitter projected the optical signal and the distance between the transmitter and the receiver. A more precise value for the height of the reflective surface may be obtained by interpolating a value for the height from a value calculated using the angle at which the optical signal is first detected by the receiver and a value calculated using the angle at which the optical signal is almost no longer detectable by the receiver. In such a manner, the height is determined sing both sides of the receivers field of vision.

Turning back to FIG. 3: projecting (300), by a projection module, a plurality of optical signals (314) to a plurality of reference points on at least one reflective surface above the racks of the datacenter according to the method of FIG. 3 also includes determining (306), for each optical signal (314), a transmission orientation (310) for projecting that optical signal (314) in dependence upon the height (304) of the reflective surface above the projection module and a predetermined reference point pattern (308). The predetermined reference point pattern (308) of FIG. 3 specifies the position on the reflective surface for each reference point. In many embodiments, the predetermined reference point pattern (308) specifies enough reference points scattered throughout a datacenter so that all of the position detection modules on the racks can detect an optical signal reflected off the reflective surface at least one reference point.

Figure 4B:
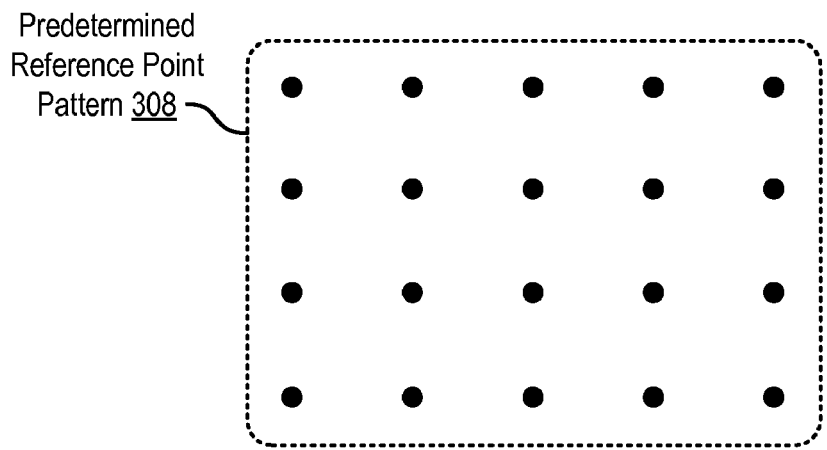
FIG. 4B sets forth a line drawing illustrating an exemplary predetermined reference point pattern useful in providing position information to computing equipment installed in racks of a datacenter according to embodiments of the present invention.

For an example of a predetermined reference point pattern (308), consider FIG. 4B that sets forth a line drawing illustrating an exemplary predetermined reference point pattern (308) useful in providing position information to computing equipment installed in racks of a datacenter according to embodiments of the present invention. The reference points specified by the pattern (404) of FIG. 4B form a grid on a reflective surface.

Turning back to FIG. 3, readers will recall that the method of FIG. 3 includes determining (306), for each optical signal (314), a transmission orientation (310) for projecting that optical signal (314). The transmission orientations (310) of FIG. 3 represent the angles at which the projection module transmits the optical signals such that each signal strikes the reflective surface at the signal's corresponding reference point on the reflective surface. Determining (306), for each optical signal (314), a transmission orientation (310) for projecting that optical signal (314) according to the method of FIG. 3 may be carried out by determining the location of the reference point for that optical signal relative to the projection module based on the reference point pattern (308) and calculating the angles in vertical and horizontal planes at which the optical signal is to be projected using the reference point location, the height (304), and any number of trigonometric functions as will occur to those of skill in the art.

In the method of FIG. 3, projecting (300), by a projection module, a plurality of optical signals (314) to a plurality of reference points on at least one reflective surface above the racks of the datacenter also includes projecting (312) each optical signal (314) to the corresponding reference point in dependence upon the transmission orientation (310) determined for that optical signal (314). Projecting (312) each optical signal (314) to the corresponding reference point according to the method of FIG. 3 may be carried out by orienting various mirrors, lenses, or transmission components according to the transmission orientation (310) for each optical signal and modulating each signal to encode reference point position information (316).

The method of FIG. 3 includes detecting (318), by a position detection module mounted on one of the racks, one or more of the optical signals (314) reflected off of the reflective surface. Detecting (318), by a position detection module mounted on one of the racks, one or more of the optical signals (314) reflected off of the reflective surface according to the method of FIG. 3 may be carried out by receiving the one or more optical signals in a receiver of the position detection module and identifying the orientation (328) at which the signals are received. The reception orientation (328) represents the angles in the vertical and horizontal planes at which the position detection module receives the optical signals reflected from the reflective surface.

The method of FIG. 3 also includes determining (322), by the position detection module, rack position information (324) in dependence upon the reference point position information (316) encoded in the detected optical signals (316). The rack position information (324) of FIG. 3 specifies the position of the particular rack relative to some fixed location such as, for example, a corner of a room, a specific location in the datacenter, geographic coordinates, and so on. Determining (322), by the position detection module, rack position information (324) according to the method of FIG. 3 may be carried out by calculating the position of the position detection module relative to at least one reference point and determining the rack's position relative to the fixed reference point used to specify the position of the reference point. For example, consider that a projection module projects a particular optical signal at reference point on a reflective surface that is ten feet from the data center's North wall. Further consider that a position detection module mounted on a rack detects the optical signal and calculates that the rack is five feet south of that reference point. By decoding the reference point position information encoded in the optical signal, the position detection module may determine that the rack on which it is mounted is fifteen feet from the datacenter's North wall. As mentioned above, the position detection module may detect more than one optical signal, each signal reflected from a reflective surface at a different reference point. In some embodiments, readers will note that detecting more than one optical signal may increase the accuracy of determining the position of the rack.

Figure 5:
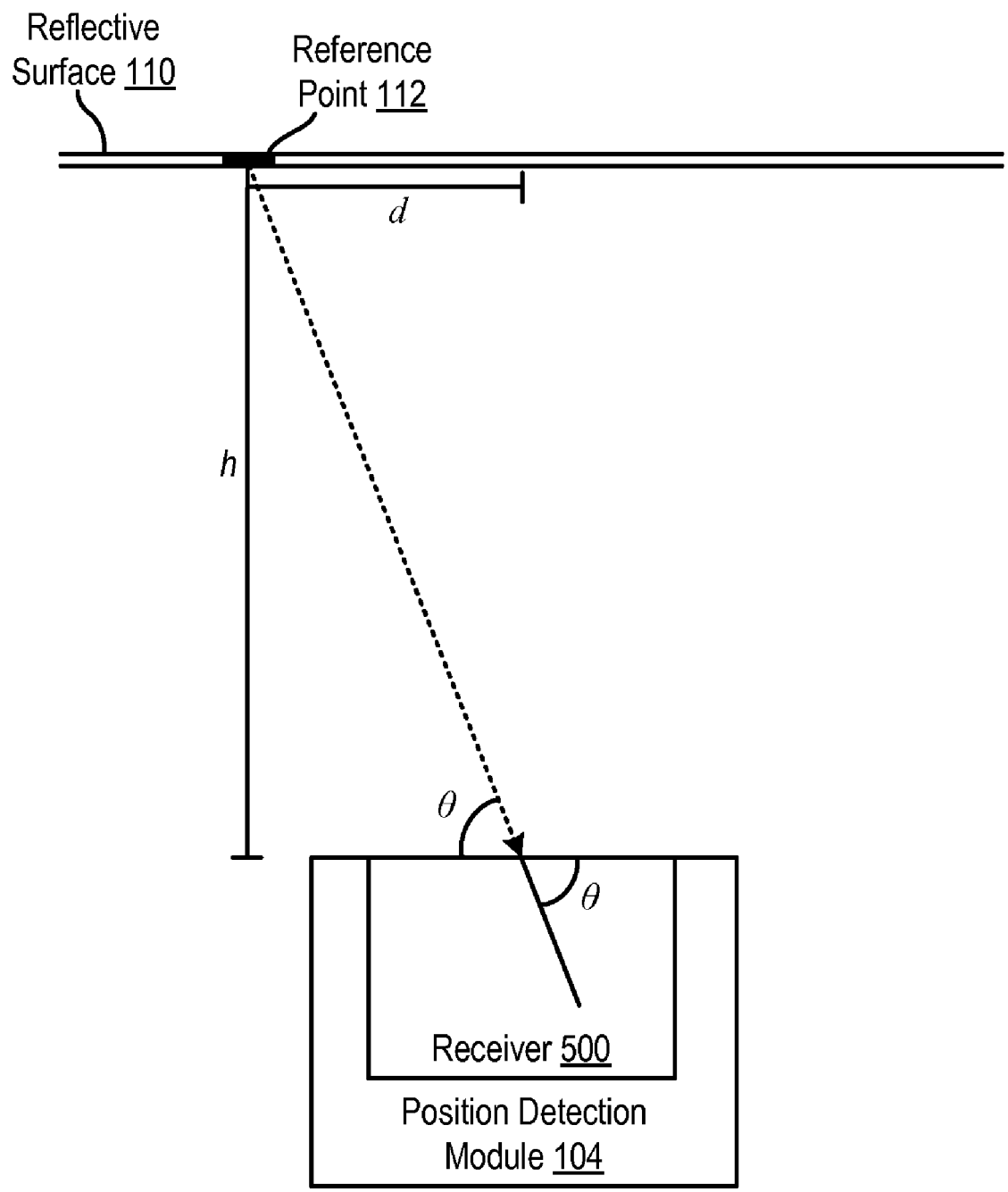
FIG. 5 sets forth a line drawing illustrating an exemplary position detection module useful in providing position information to computing equipment installed in racks of a datacenter according to embodiments of the present invention.

For further explanation of calculating the position of the position detection module relative to at least one reference point, consider FIG. 5 that sets forth a line drawing illustrating an exemplary position detection module (104) useful in providing position information to computing equipment installed in racks of a datacenter according to embodiments of the present invention. The position detection module (104) includes an optical signal receiver (500) that detects an optical signal reflected off of the reflective surface (110) at a reference point (112). The optical signal receiver (500) receives the optical signal at an angle θ. The position detection module (104) may calculate the position of the position detection module relative to at least one reference point according to the following formula:

$$d = h \div \tan(\theta)$$

where d is the horizontal distance between the reference point (112) and the point at which the optical signal enters the position detection module, h is the height of the reflective surface above the position detection module, and θ is the angle at which the optical signal enters the receiver (500) from the reference point (112). While the angle θ may be identified by the receiver (500) when the signal enters the position detection module (104), the height h may be retrieved from the memory of the position detection module (104). The height h may have been preconfigured in memory by a system administrator or the position detection module (104) may have calculated a value for height h when the position detection module (104) first initialized. In other embodiments, however, a projection module may have encoded a value that it calculated for the height h when the projection module initialized. The position detection module (104) may therefore decode height h from the optical signal provided by a projection module. Still further, in other embodiments, the position detection module (104) may calculate the height using two reference points separated by a known distance.

Readers will note that determining (322), by the position detection module, rack position information (324) in dependence upon the reference point position information (316) encoded in the detected optical signals (316) and the height of the reflective surface (110) above the position detection module (104) as described above is for explanation only and not for limitation. In other embodiments, the position detection module (104) may determine (322) rack position information (324) without using the height of the reflective surface above the position detection module (104) at all. In such embodiments, a projection module may project a reference point directly over each position detection module and encode the position of each reference point in the optical signal transmitted to that reference point. Each position detection module may then receive the optical signal and detection the position information for that optical signal. Because the reference point is directly above the position detection module, the position information of the reference point is the same as the position information for the position detection module.

In some embodiments, the rack position information (324) may also include rack location information and rack orientation information. Rack location information specifies the physical location of the rack relative to some predefined or fixed reference such as, for example, a location from a particular corner of the datacenter or using a geographic coordinate. Rack orientation information specifies the physical orientation of the rack at the location specified by the rack location information. That is, rack orientation information specifies the direction in which one of the sides of the rack faces. When combined with information describing the specific location of components inside the rack or rack equipment, the rack location information and rack orientation information may be used to identify the location of specific components inside the rack or rack equipment relative to all of the other components in the datacenter. Consider, for example, that the location of a temperature sensor is known to be located in the rear, left portion of a piece of equipment installed in the rack. Further consider that the rack location information is known. Because each rack may be several feet in depth, the location of the temperature sensor may only be identified within a range of approximately several feet using only the rack location information. If the rack orientation information is known, however, the location of the temperature sensor may be precisely located. Accordingly, including rack location information and rack orientation information in the rack position information (324) is advantageous when the precise location of components inside the rack or rack equipment is desirable. The position detection module may determine the rack orientation using a second optical receiver, which when combined with the location information calculated using a first optical receiver, allows the position module to calculate the rack's orientation.

For further explanation of rack orientation information, consider a datacenter that is divided into six grid blocks having predefined locations in the datacenter and arranged in two rows 'A' and 'B' that extend in parallel in the East and West directions. Each row is comprised of three grid blocks numbered '1,' '2,' and '3.' In total, the datacenter includes six racks. The following table that specifies exemplary rack position information for the six racks in the datacenter:

TABLE 1

EXEMPLARY RACK POSITION INFORMATION

| RACK ID | RACK LOCATION INFO. | RACK ORIENTATION INFO. |
|---|---|---|
| 1 | A1 | North |
| 2 | A2 | North |
| 3 | A3 | North |
| 4 | B1 | South |
| 5 | B2 | South |
| 6 | B3 | South |

The exemplary rack position information above specifies that rack '1' is located in grid block 'A1' and faces the North direction. Rack '2' is located in grid block 'A2' and faces the North direction. Rack '3' is located in grid block 'A3' and faces the North direction. Rack '4' is located in grid block 'B1' and faces the South direction. Rack '5' is located in grid block 'B2' and faces the South direction. Rack '6' is located in grid block 'B3' and faces the South direction. From the exemplary rack position information above, readers will note that the racks are arranged in two rows that extend in the East and West directions through the datacenter opposite one another. Readers will further note that the racks opposite one another face each other. The exemplary rack position information is for explanation only and not for limitation. In fact, other embodiments of rack position information in other formats may also be useful in embodiments of the present invention.

The method of claim 3 includes providing (326), by the position detection module, the rack position information (324) to a position information consumer (330) that uses the rack position information to identify the position of the rack on which the position detection module is mounted in the datacenter. Providing (326), by the position detection module, the rack position information (324) to a position information consumer (330) according to embodiments of the present invention may be carried out by transmitting the rack position information (324) to the position information consumer (330) through a data communications connection such as, for example, $I^2C$ bus connection, 1-Wire bus connection, SMB connection, SPI bus connection, IPMB connection, USB connection, TCP/IP connection, and so on.

As mentioned above, a position information consumer (330) is a software module that uses the rack position information to identify the position of the rack on which the position detection module is mounted in the datacenter. A position information consumer (330) may be implemented as software installed on equipment mounted in the rack, management software installed in a management module inside the rack, management software installed on an administrative node of the datacenter, remote management software for remotely administering the datacenter, and so on. In any given embodiment, there may be a single position information consumer or multiple position information consumers. Upon receiving the rack position information from a rack in the datacenter, a position information consumer (330) may render the rack position information (324) for the rack on a GUI for viewing by a system administrator or record the rack position information (324) in data storage for later use by a system administrator.

In some embodiments, the position information consumer (330) may include equipment height information describing heights in the datacenter of the equipment installed in the rack on which the position detection module is mounted. The position information consumer (330) may identify the heights of rack equipment in a manner described in U.S. Pat. No. 6,762,691, and incorporated herein by reference. Using the equipment height information along with the rack position information (324), the position information consumer (330) may identify the three-dimensional placement of rack equipment in the datacenter. In addition, if the rack position information (324) includes both rack location information and rack orientation information, the position information consumer (330) may identify the three-dimensional placement of individual components inside the rack or rack equipment.

Readers will note that, in some embodiments, the datacenter may be too large to practically project optical signals to all of the reference points on the reflective surfaces using a single projection module. In such embodiments, additional projection modules may be used to project all of the optical signals. For further explanation, therefore, FIG. 6 sets forth a line drawing illustrating a further exemplary datacenter (100) useful in providing position information to computing equipment installed in racks of the datacenter (100) according to embodiments of the present invention.

Figure 6:
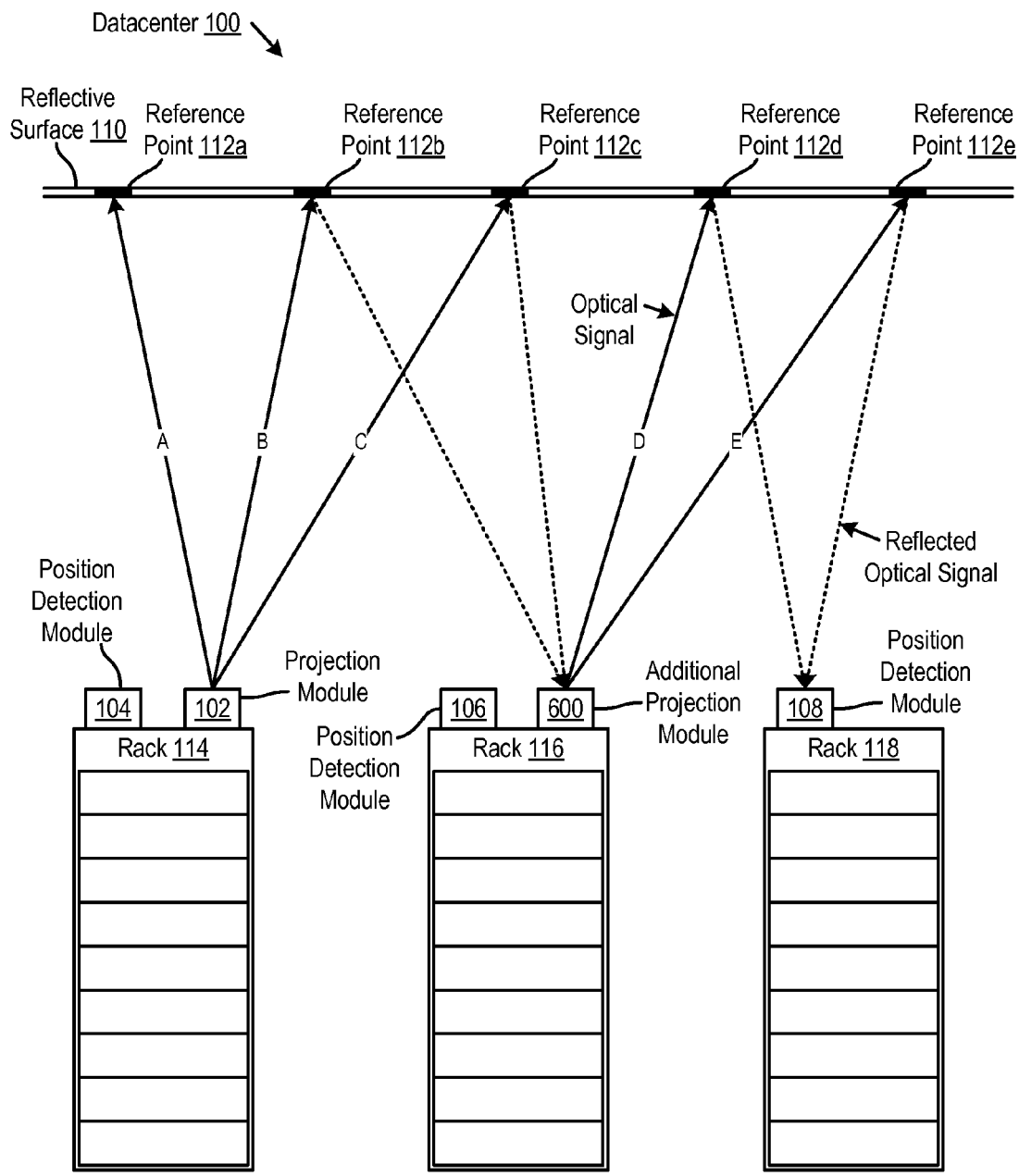
FIG. 6 sets forth a line drawing illustrating a further exemplary datacenter useful in providing position information to computing equipment installed in racks of a datacenter according to embodiments of the present invention.

The datacenter (100) of FIG. 6 includes three racks (114, 116, 118). Each rack (114, 116, 118) has mounted on it a position detection module (104, 106, 108). The position detection module (104) is mounted on rack (114). The position detection module (106) is mounted on rack (116). The position detection module (108) is mounted on rack (118).

In the exemplary datacenter (100) of FIG. 6, a projection module (102) is mounted on the rack (114). The projection module (102) projects three optical signals 'A,' 'B,' and 'C' at reference points (112a, 112b, 112c) on the reflective surface (110). The projection module (102) projects optical signal 'A' at reference points (112a), optical signal 'B' at reference points (112b), and optical signal 'C' at reference points (112c). In the example of FIG. 6, however, the projection module (102) does not project optical signals to reference points (112d, 112e). The projection module (102) may not be able to practically project a signal at reference points (112d, 112e) for a variety of reason such as, for example, the distance being too far, interference exists between the projection module (102) and the reference points (112a, 112b, 112c), and any other as will occur to those of skill in the art.

Because the position detection module (108) in FIG. 6 does not adequately receive optical signals from reference points (112a, 112b, 112c), the exemplary datacenter (100) of FIG. 6 includes an additional projection module (600) mounted on rack (116). The additional projection module (600) is a computing system that operates for according to embodiments of the present invention by: detecting optical signals 'B' and 'C' reflected off of the reflective surface (110); determining projection module position information for the additional projection module (600) in dependence upon the reference point position information encoded in the detected optical signals 'B' and 'C'; and projecting additional optical signals 'D' and 'E' to additional reference points (112d, 112e) on the reflective surface (110). Each additional optical signal 'D' and 'E' corresponds uniquely to one of the additional reference points (112d, 112e) and encodes reference point position information for that corresponding additional reference point (112d, 112e). In such a manner, position detection module (108) may use optical signals 'D' and 'E' to determine rack position information in dependence upon the reference point position information encoded in the detected optical signals 'D' and 'E.'

Figure 7:
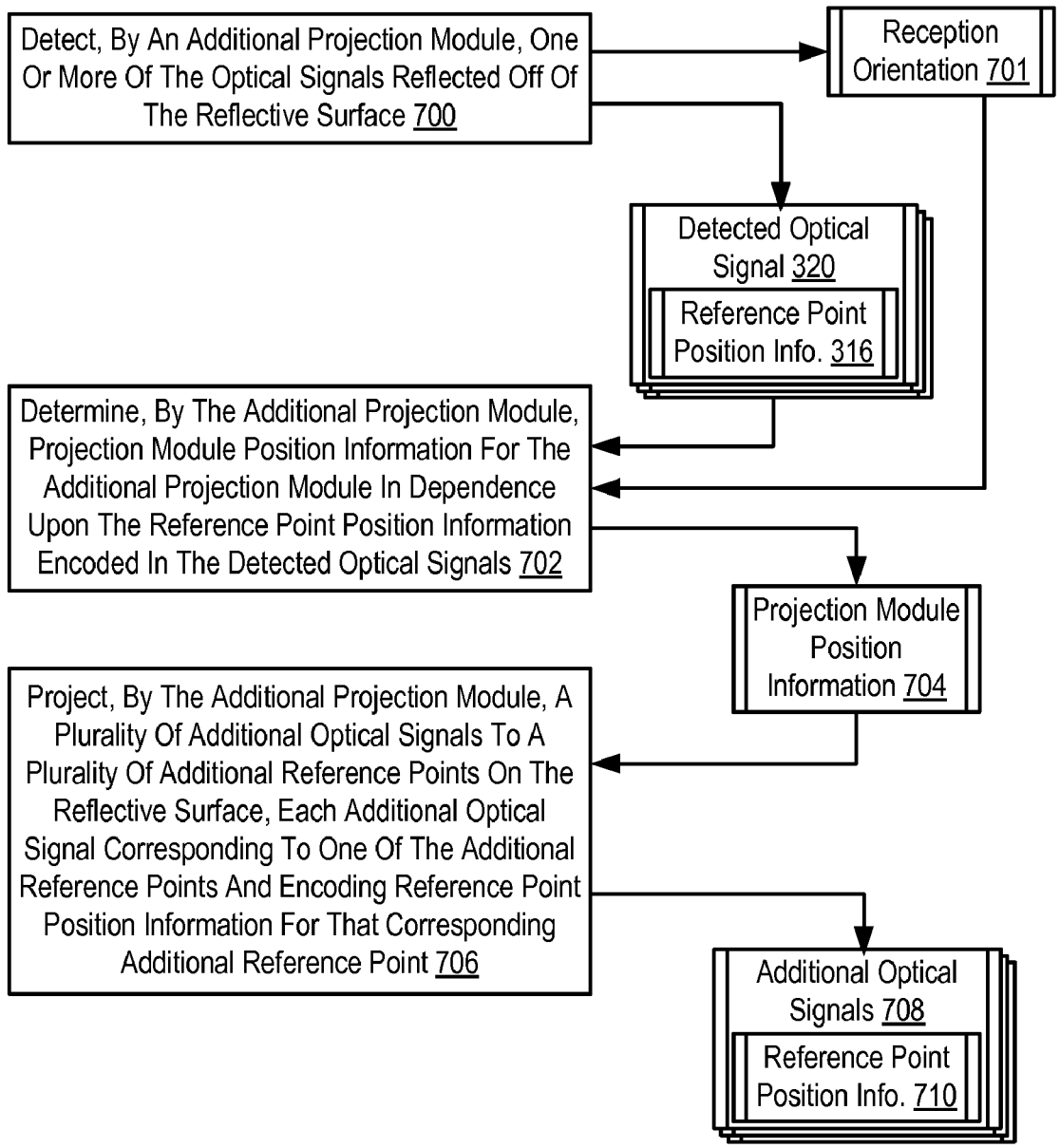
FIG. 7 sets forth a flow chart illustrating a further exemplary method for providing position information to computing equipment installed in racks of a datacenter according to embodiments of the present invention.

For further explanation of how the additional projection module operates in according with embodiments of the present invention, FIG. 7 sets forth a flow chart illustrating a further exemplary method for providing position information to computing equipment installed in racks of a datacenter according to embodiments of the present invention. The method of FIG. 7 includes detecting (700), by an additional projection module, one or more of the optical signals (320) reflected off of the reflective surface. Detecting (700), by an additional projection module, one or more of the optical signals (320) reflected off of the reflective surface according to the method of FIG. 7 may be carried out by receiving the one or more optical signals in a receiver of the additional projection module and identifying the orientation (701) at which the signals are received. The reception orientation (701) represents the angles in the vertical and horizontal planes at which the additional projection module receives the optical signals reflected from the reflective surface.

The method of FIG. 7 includes determining (702), by the additional projection module, projection module position information (704) for the additional projection module in dependence upon the reference point position information (316) encoded in the detected optical signals (320). The rack position information (704) of FIG. 7 specifies the position of the additional projection module relative to some fixed location such as, for example, a corner of a room, a specific location in the datacenter, geographic coordinates, and so on.

Determining (702), by the additional projection module, projection module position information (704) for the additional projection module according to the method of FIG. 7 may be carried out by calculating the position of the additional projection module relative to at least one reference point and determining the additional projection module's position relative to the fixed reference point used to specify the position of the reference point. For example, consider that a projection module projects a particular optical signal at reference point on a reflective surface that is twenty feet from the data center's West wall. Further consider that an additional projection module mounted on a rack detects the optical signal and calculates that the additional projection module is twenty feet east of that reference point. By decoding the reference point position information encoded in the optical signal, the additional projection module may determine that the additional projection module is forty feet from the datacenter's West wall. As mentioned above, the additional projection module may detect more than one optical signal, each signal reflected from a reflective surface at a different reference point. In some embodiments, readers will note that detecting more than one optical signal may increase the accuracy of determining the position of the additional projection module, thereby increasing the accuracy of determining positions based on the signals projected from the additional projection module.

The method of claim 7 includes projecting (706), by the additional projection module, a plurality of additional optical signals (708) to a plurality of additional reference points (710) on the reflective surface. The additional projection module may project (706) a plurality of additional optical signals (708) to a plurality of additional reference points (710) on the reflective surface according to the method of FIG. 7 using a system of mirrors and lens configured in a manner that will occur to those of ordinary skill in the art. Each additional optical signal (708) corresponds to one of the additional reference points. That is, the additional projection module may transmit one additional optical signal for each additional reference point, each optical signal striking a different reference point on the reflective surface. Each optical signal (708) also encodes reference point position information (710) for the additional reference point that corresponds to that optical signal.

Exemplary embodiments of the present invention are described largely in the context of a fully functional computer system for providing position information to computing equipment installed in racks of a datacenter. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of providing position information to computing equipment installed in racks of a datacenter, the method comprising:

projecting, by a projection module, a plurality of optical signals to a plurality of reference points on at least one reflective surface above the racks of the datacenter, each optical signal corresponding to one of the reference points and encoding reference point position information for that corresponding reference point;

detecting, by a position detection module mounted on one of the racks, one or more of the optical signals reflected off of the reflective surface;

determining, by the position detection module, rack position information in dependence upon the reference point position information encoded in the detected optical signals; and providing, by the position detection module, the rack position information to a position information consumer that uses the rack position information to identify the position of the rack on which the position detection module is mounted in the datacenter.

2. The method of claim 1 wherein the position information consumer includes equipment height information describing heights in the datacenter of the equipment installed in the rack on which the position detection module is mounted.

3. The method of claim 1 wherein projecting, by a projection module, a plurality of optical signals to a plurality of reference points on a reflective surface above the racks of the datacenter further comprises:

identifying a height of the reflective surface above the projection module;

determining, for each optical signal, a transmission orientation for projecting that optical signal in dependence upon the height of the reflective surface above the projection module and a predetermined reference point pattern, the predetermined reference point pattern specifying the reference point position on the reflective surface for each reference point; and projecting each optical signal to the corresponding reference point in dependence upon the transmission orientation determined for that optical signal.

4. The method of claim 1 wherein the reference points form a grid on the reflective surface.

5. The method of claim 1 wherein the rack position information further comprises rack location information and rack orientation information.

6. The method of claim 1 further comprising:

detecting, by an additional projection module, one or more of the optical signals reflected off of the reflective surface;

determining, by the additional projection module, projection module position information for the additional projection module in dependence upon the reference point position information encoded in the detected optical signals; and projecting, by the additional projection module, a plurality of additional optical signals to a plurality of additional reference points on the reflective surface, each additional optical signal corresponding to one of the additional reference points and encoding reference point position information for that corresponding additional reference point.

7. Apparatus for providing position information to computing equipment installed in racks of a datacenter, the apparatus comprising a computer processor, a computer memory operatively coupled to the computer processor, the computer memory having disposed within it computer program instructions capable of:

projecting, by a projection module, a plurality of optical signals to a plurality of reference points on at least one reflective surface above the racks of the datacenter, each optical signal corresponding to one of the reference points and encoding reference point position information for that corresponding reference point;

detecting, by a position detection module mounted on one of the racks, one or more of the optical signals reflected off of the reflective surface;

determining, by the position detection module, rack position information in dependence upon the reference point position information encoded in the detected optical signals; and providing, by the position detection module, the rack position information to a position information consumer that uses the rack position information to identify the position of the rack on which the position detection module is mounted in the datacenter.

8. The apparatus of claim 7 wherein the position information consumer includes equipment height information describing heights in the datacenter of the equipment installed in the rack on which the position detection module is mounted.

9. The apparatus of claim 7 wherein projecting, by a projection module, a plurality of optical signals to a plurality of reference points on a reflective surface above the racks of the datacenter further comprises:

identifying a height of the reflective surface above the projection module;

determining, for each optical signal, a transmission orientation for projecting that optical signal in dependence upon the height of the reflective surface above the projection module and a predetermined reference point pattern, the predetermined reference point pattern specifying the reference point position on the reflective surface for each reference point; and projecting each optical signal to the corresponding reference point in dependence upon the transmission orientation determined for that optical signal.

10. The apparatus of claim 7 wherein the reference points form a grid on the reflective surface.

11. The apparatus of claim 7 wherein the rack position information further comprises rack location information and rack orientation information.

12. The apparatus of claim 7 wherein the computer memory has disposed within it computer program instructions capable of:

detecting, by an additional projection module, one or more of the optical signals reflected off of the reflective surface;

determining, by the additional projection module, projection module position information for the additional projection module in dependence upon the reference point position information encoded in the detected optical signals; and projecting, by the additional projection module, a plurality of additional optical signals to a plurality of additional reference points on the reflective surface, each additional optical signal corresponding to one of the additional reference points and encoding reference point position information for that corresponding additional reference point.

13. A computer program product for providing position information to computing equipment installed in racks of a datacenter, the computer program product disposed in a computer readable medium, the computer program product comprising computer program instructions capable of:

projecting, by a projection module, a plurality of optical signals to a plurality of reference points on at least one reflective surface above the racks of the datacenter, each optical signal corresponding to one of the reference points and encoding reference point position information for that corresponding reference point;

detecting, by a position detection module mounted on one of the racks, one or more of the optical signals reflected off of the reflective surface;

determining, by the position detection module, rack position information in dependence upon the reference point position information encoded in the detected optical signals; and providing, by the position detection module, the rack position information to a position information consumer that uses the rack position information to identify the position of the rack on which the position detection module is mounted in the datacenter.

14. The computer program product of claim 13 wherein the position information consumer includes equipment height information describing heights in the datacenter of the equipment installed in the rack on which the position detection module is mounted.

15. The computer program product of claim 13 wherein projecting, by a projection module, a plurality of optical signals to a plurality of reference points on a reflective surface above the racks of the datacenter further comprises:

identifying a height of the reflective surface above the projection module;

determining, for each optical signal, a transmission orientation for projecting that optical signal in dependence upon the height of the reflective surface above the projection module and a predetermined reference point pattern, the predetermined reference point pattern specifying the reference point position on the reflective surface for each reference point; and projecting each optical signal to the corresponding reference point in dependence upon the transmission orientation determined for that optical signal.

16. The computer program product of claim 13 wherein the reference points form a grid on the reflective surface.

17. The computer program product of claim 13 wherein the rack position information further comprises rack location information and rack orientation information.

18. The computer program product of claim 13 further comprising computer program instructions capable of:

detecting, by an additional projection module, one or more of the optical signals reflected off of the reflective surface;

determining, by the additional projection module, projection module position information for the additional projection module in dependence upon the reference point position information encoded in the detected optical signals; and projecting, by the additional projection module, a plurality of additional optical signals to a plurality of additional reference points on the reflective surface, each additional optical signal corresponding to one of the additional reference points and encoding reference point position information for that corresponding additional reference point.

19. The computer program product of claim 13 wherein the computer readable medium comprises a recordable medium.

20. The computer program product of claim 13 wherein the computer readable medium comprises a transmission medium.

* * * * *